US012776635B2

(12) United States Patent
Wilkinson et al.

(10) Patent No.: US 12,776,635 B2
(45) Date of Patent: Oct. 27, 2026

(54) ELECTRICAL STRIKE DISSIPATION

(71) Applicant: The Boeing Company, Arlington, VA (US)

(72) Inventors: Marianne E. Wilkinson, Redmond, WA (US); Scott M. Spencer, Everett, WA (US)

(73) Assignee: The Boeing Company, Arlington, VA (US)

( * ) Notice: Subject to any disclaimer, the term of this patent is extended or adjusted under 35 U.S.C. 154(b) by 282 days.

(21) Appl. No.: 18/754,551

(22) Filed: Jun. 26, 2024

(65) Prior Publication Data

US 2026/0005505 A1 Jan. 1, 2026

(51) Int. Cl.
*H02G 13/00* (2006.01)

(52) U.S. Cl.
CPC .................................. *H02G 13/80* (2013.01)

(58) Field of Classification Search
CPC ...................................................... H02G 13/80
USPC ......................................................... 361/218
See application file for complete search history.

(56) References Cited

U.S. PATENT DOCUMENTS 4,884,929 A * 12/1989 Smith ..................... F16B 37/14 411/3
4,979,281 A * 12/1990 Smith .................... B64D 45/02 403/18
5,845,872 A * 12/1998 Pridham ................ B64D 45/02 244/1 A
5,866,272 A * 2/1999 Westre .................... B64C 30/00 244/119
8,092,134 B2 * 1/2012 Oguri .................. B29C 66/1122 411/372.5
8,186,614 B2 5/2012 Sáchez-Brunete Álvarez et al.
8,246,770 B2 * 8/2012 Ackerman .............. B32B 38/10 156/298
8,393,068 B2 * 3/2013 Keener ................. B29C 65/601 411/908
8,413,929 B2 * 4/2013 Kamino .................... B64C 3/26 244/1 A
8,651,413 B2 * 2/2014 Kashiwagi ............ F16B 33/004 204/196.18
9,290,276 B2 * 3/2016 Watanabe .............. B64D 45/02
9,291,187 B2 * 3/2016 Whitlock ............... B64D 45/02
(Continued)

FOREIGN PATENT DOCUMENTS

GB 2522841 A 8/2015

*Primary Examiner* — Dharti H Patel
(74) *Attorney, Agent, or Firm* — Alleman Hall LLP

(57) ABSTRACT

A system for electrical strike dissipation includes a fastener, a composite laminate, and a structural element. The fastener has a tapered head and a shank. The composite laminate includes a first composite ply and a second composite ply. The first composite ply defines a tapered bore, and has multiple first tow groups. Some first tow groups have three or more conductive fibers stacked directly on each other. The three or more conductive fibers are operational to conduct current of an electrical strike. The tapered bore extends through the first composite ply and is sized to receive the tapered head. The second composite ply defines a straight bore, and has multiple second tow groups. The straight bore extends through the second composite ply and is sized to receive the shank. The structural element is aligned with the composite laminate and is secured to the composite laminate by the fastener.

20 Claims, 4 Drawing Sheets

(56) References Cited

U.S. PATENT DOCUMENTS

| | | | | |
|---|---|---|---|---|
| 9,593,238 | B2 | 3/2017 | Arai et al. | |
| 11,447,266 | B2 * | 9/2022 | Tajiri | B32B 3/266 |
| 12,612,187 | B2 * | 4/2026 | Chirol | B64F 5/40 |
| 2017/0098930 | A1 * | 4/2017 | Le | B29C 70/882 |
| 2017/0361944 | A1 * | 12/2017 | Schmidt | B32B 7/025 |
| 2018/0135683 | A1 * | 5/2018 | Sisco | C23C 4/00 |
| 2020/0031069 | A1 * | 1/2020 | Lewis | B29C 70/70 |

* cited by examiner

ELECTRICAL STRIKE DISSIPATION

TECHNICAL FIELD

The disclosure relates generally to composite component manufacturing, and in particular, to electrical strike dissipation.

BACKGROUND

Active aircraft are struck by lightning once or twice a year. Therefore, the aircraft are designed so that the lightning strikes are an ordinary situation with no impact to the aircraft or travelers. Designs of the aircraft protect the aircraft fuel tanks from sparking, protect onboard computers from electronic upset, and direct the lightning currents away from occupants and sensitive places. An issue with composite laminate construction is that the composite laminates do not conduct current very well. Furthermore, due to hole irregularities and fastener fit criteria, the fasteners have a limited contact area with the composite laminate. As such, the lightning currents have the potential of traveling down the fasteners to the interior of the aircraft.

Accordingly, those skilled in the art continue with research and development efforts in the field of dissipating electrical strikes along an exterior skin of the aircraft.

SUMMARY

A system is provided herein. The system includes a fastener, a composite laminate, and a structural element. The fastener has a tapered head that conducts electricity, and the fastener has a shank. The composite laminate includes a first composite ply and a second composite ply. The first composite ply defines an outer surface, defines a tapered bore, and has a plurality of first tow groups oriented in a plurality of directions parallel to the outer surface. A conductive tow group of the plurality of first tow groups has three or more conductive fibers stacked directly on each other in a normal direction relative to the outer surface. The three or more conductive fibers are oriented in a given direction of the plurality of directions. The three or more conductive fibers are operational to conduct current of the electrical strike. The tapered bore extends through the first composite ply and is sized to receive the tapered head of the fastener. The second composite ply is attached to the first composite ply, defines a straight bore, and has a plurality of second tow groups oriented in the plurality of directions. The straight bore extends through the second composite ply and is sized to receive the shank of the fastener. The structural element is aligned with the composite laminate and secured to the composite laminate by the fastener.

In one or more embodiments of the system, the conductive tow group comprises two or more conductive tow groups separated from each other by one or more of the plurality of first tow groups.

In one or more embodiments of the system, the three or more conductive fibers are arranged to solely intersect the fastener in the tapered bore to confine the electricity approximate an outer layer of the composite laminate.

In one or more embodiments, the system includes a malleable coating disposed on the tapered head of the fastener, and operational to electrically connect the fastener to the three or more conductive fibers due to a fastener pre-load while the fastener is seated.

In one or more embodiments of the system, a plurality of first ends of the three or more conductive fibers are formed to match the tapered bore and physically contact the tapered head.

In one or more embodiments of the system, a plurality of second ends of the plurality of second tow groups are formed to match the straight bore.

In one or more embodiments, the system includes one or more outer tow groups of the plurality of first tow groups disposed on an opposite side of the conductive tow group as the one or more second tow groups.

In one or more embodiments of the system, an outer end of the tapered head of the fastener is flush with the outer surface of the first composite ply while seated.

In one or more embodiments of the system, the system forms part of an aircraft.

In one or more embodiments of the system, the given direction is one or more of (i) a wing direction of the aircraft and (ii) a fuselage direction of the aircraft.

A method of fabrication for electrical strike dissipation is provided herein. The method includes aligning a composite laminate with a structural element to receive a fastener. The fastener has a tapered head that conducts electricity, and the fastener has a shank. The composite laminate includes a first composite ply and a second composite ply. The first composite ply defines an outer surface, defines a tapered bore, and has a plurality of first tow groups oriented in a plurality of directions parallel to the outer surface. A conductive tow group of the plurality of first tow groups has three or more conductive fibers stacked directly on each other in a normal direction relative to the outer surface. The three or more conductive fibers are oriented in a given direction of the plurality of directions. The three or more conductive fibers are operational to conduct current of the electrical strike. The tapered bore extends through the first composite ply and is sized to receive the tapered head of the fastener. The second composite ply is attached to the first composite ply, defines a straight bore, and has a plurality of second tow groups oriented in the plurality of directions. The straight bore extends through the second composite ply and is sized to receive the shank of the fastener. The method includes securing the composite laminate to the structural element with the fastener.

In one or more embodiments of the method, the conductive tow group comprises two or more conductive tow groups separated from each other by one or more of the plurality of first tow groups.

In one or more embodiments, the method includes arranging the three or more conductive fibers to solely intersect the fastener in the tapered bore to confine the electricity approximate an outer layer of the composite laminate.

In one or more embodiments, the method includes disposing a malleable coating on the tapered head of the fastener to electrically connect the fastener to the three or more conductive fibers due to a fastener pre-load while the fastener is seated.

In one or more embodiments, the method includes matching a plurality of first ends of the three or more conductive fibers to the tapered bore to physically contact the tapered head.

In one or more embodiments, the method includes matching a plurality of second ends of the plurality of second tow groups to the straight bore.

In one or more embodiments, the method includes disposing one or more outer tow groups of the plurality of first tow groups on an opposite side of the conductive tow group as the one or more second tow groups.

In one or more embodiments of the method, an outer end of the tapered head of the fastener is flush with the outer surface of the first composite ply while seated.

In one or more embodiments of the method, the method fabricates part of an aircraft.

A composite laminate is provided herein. The composite laminate includes a first composite ply and a second composite ply. The first composite ply defines an outer surface, defines a tapered bore, and has a plurality of first tow groups oriented in a plurality of directions parallel to the outer surface. A conductive tow group of the plurality of first tow groups has three or more conductive fibers stacked directly on each other in a normal direction relative to the outer surface. The three or more conductive fibers are oriented in a given direction of the plurality of directions. The three or more conductive fibers are operational to conduct current of an electrical strike. The tapered bore extends through the first composite ply and is sized to receive a tapered head of a fastener. The second composite ply is attached to the first composite ply, defines a straight bore, and has a plurality of second tow groups oriented in the plurality of directions. The straight bore extends through the second composite ply and is sized to receive a shank of the fastener.

The above features and advantages, and other features and advantages of the present disclosure are readily apparent from the following detailed description of the best modes for carrying out the disclosure when taken in connection with the accompanying drawings.

DETAILED DESCRIPTION

Embodiments of the present disclosure include a system and/or a method for manufacturing a composite laminate that addresses dissipation of electrical strikes at fasteners which attach the composite laminate to a structural element. The system/method generally groups like-oriented, continuous plies near an outer surface of the composite laminate, specifically common to a countersink region of the fasteners. The resulting structure provides an area for increased ability to conduct electrical current from a struck fastener into carbon fibers of the composite laminate by ensuring contact between the fasteners and the carbon fibers via pre-load forces. By grouping more carbon fiber filaments of like direction in a region of high fastener contact, such as the countersink, the observed resistivity generally decreases (similar to increasing a gage in electrical wire) and therefore increase the chances of conducting the electrical current into an outer surface of the skin laminate. Furthermore, a conductive, malleable coating may be applied to the head and countersink region of the fastener to provide an enhanced, lower resistance path between the fastener and the outer plies of the composite laminate.

Figure 1:
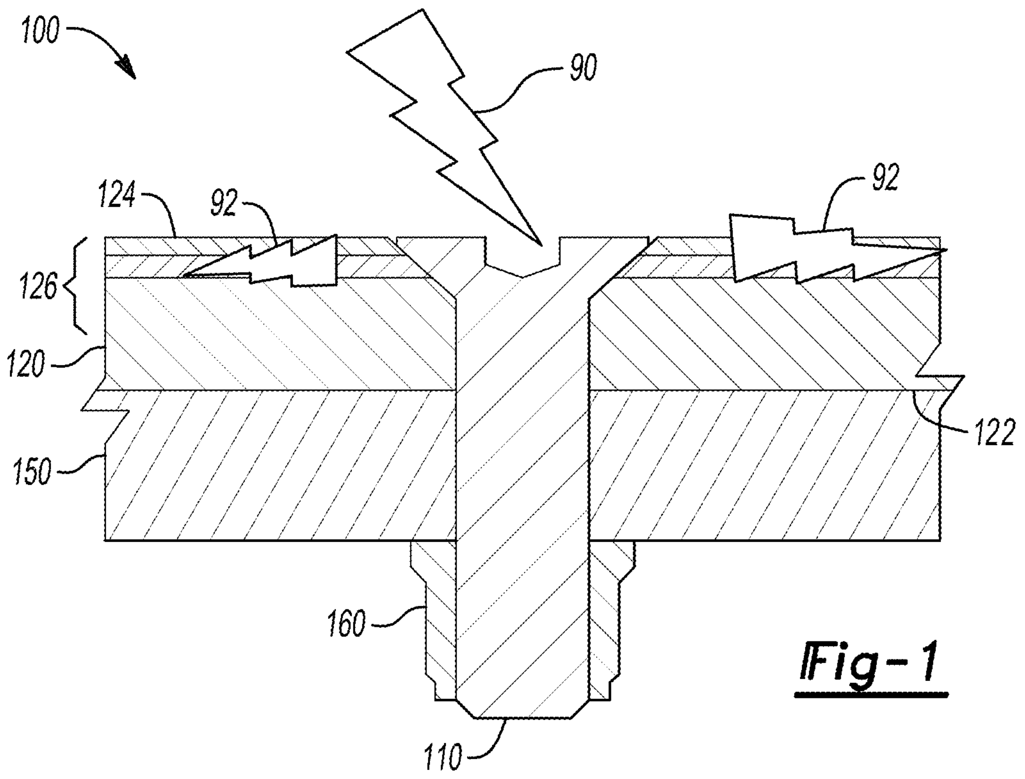
FIG. 1 is a schematic cross-sectional diagram of a system in accordance with one or more exemplary embodiments.

Referring to FIG. 1, a schematic cross-sectional diagram of an example implementation of the system 100 is shown in accordance with one or more exemplary embodiments. The system 100 generally includes a fastener 110, a composite laminate 120, a structural element 150, and a nut 160. An electrical strike 90 on a head of the fastener 110 may result in current 92 that is directed through an outer surface of the composite laminate 120.

The electrical strike 90 implements a high-voltage strike that establishes the currents 92. In various situations, the electrical strike 90 may be a natural electrical strike, such as lightning. In other situations, the electrical strike 90 may be an artificial electrical strike, such as a sequence of pulses from a pulse generator used to condition the system 100. The conditioning may be performed during a manufacturing process to reduce the effects of the natural lightning strikes before a first flight.

The fastener 110 implements a conductive fastener. The fastener 110 and the nut 160 engage each other to attach the composite laminate 120 to the structural element 150. The fastener 110 and the nut 160 are operational to apply a pre-loaded force that places a head of the fastener 110 in good physical and electrical contact with the carbon fibers in the outer layers 126 of the composite laminate 120.

The composite laminate 120 implements a multi-layer composite element. The composite laminate 120 includes a first side 122 (e.g., a bottom side as illustrated) and a second side 124 (e.g., a top side as illustrated). The first side 122 of the composite laminate 120 adjoins the structural element 150. The second side 124 of the composite laminate 120 faces away from the first side 122. The composite laminate 120 includes multiple sliced layers of tows. The various tows are aligned in multiple (e.g., 2 to 4) directions. For example, some tows may be aligned at +45 degrees relative to a given direction. Other tows are aligned at zero degrees relative to the given direction. Still other tows are aligned at −45 degrees relative to the given direction. Other tows may be aligned at 90 degrees relative to the given direction. Other sequences and/or numbers of the sliced layers may be implemented to meet the design criteria of a particular application.

A "tow" is a continuous narrow strip of composite material and may be impregnated with a resin. A "tow" may also be referred to as "slit tow" because it is created by slitting a wide roll. An overlap splice exists where a start of a tow overlaps an end of another tow. In various embodiments, the overlap splices are introduced into the hoop tows with a second pass on top of a first pass during the manufacturing of the composite component. In other embodiments, the overlap splices are present in the hoop tows before the manufacturing of the composite component begins.

The structural element 150 implements a frame. In various embodiments, different structural elements 150 are metal frames that forms various components of an aircraft. For example, the structural element 150 may be a fuselage, a wing, a tail, or other component of the aircraft. An outer surface of the structural element 150 may adjoin the first side 122 of the composite laminate 120

Figure 2:
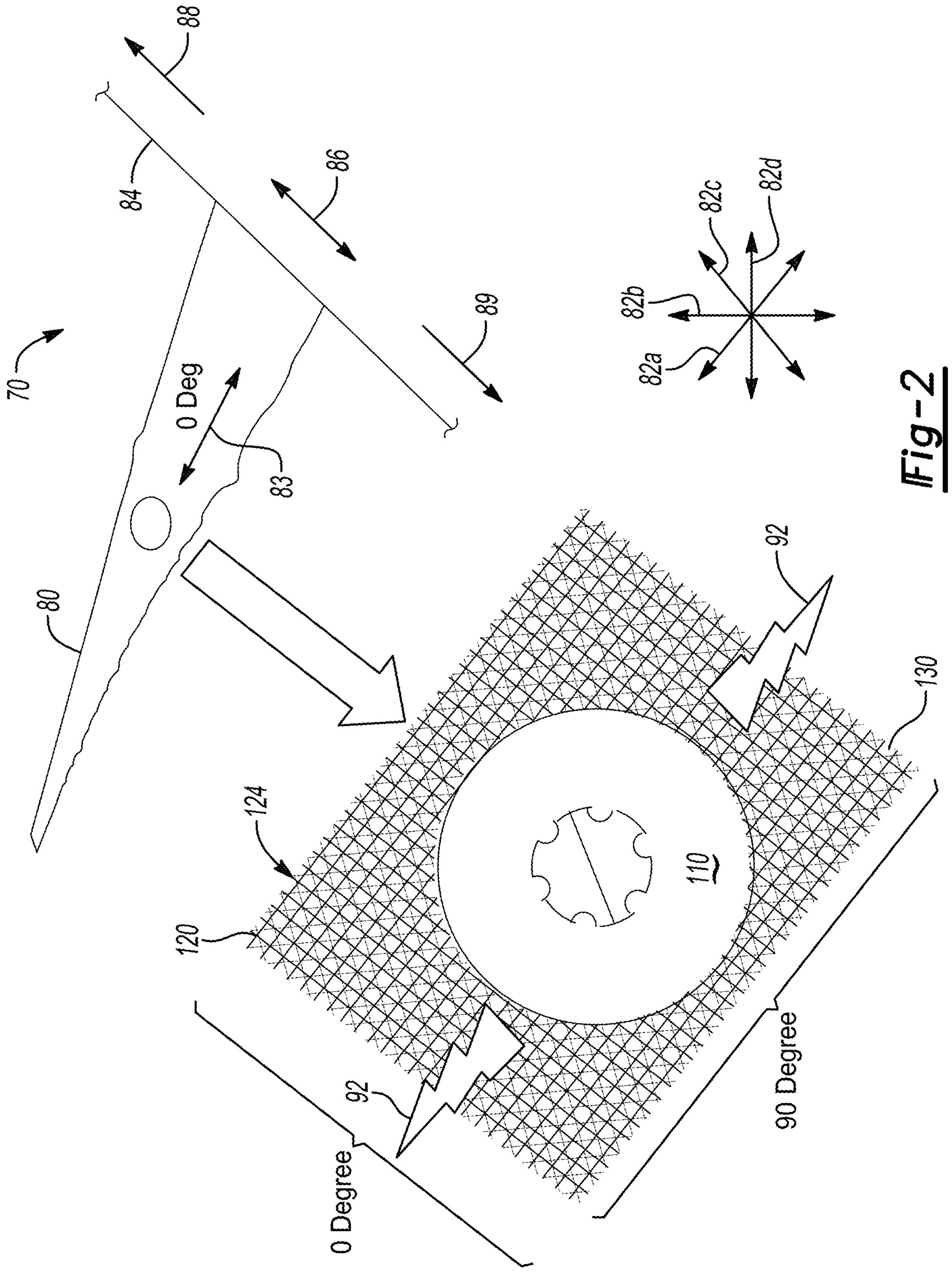
FIG. 2 is a schematic plan diagram of the system in accordance with one or more exemplary embodiments.

Referring to FIG. 2, a schematic plan diagram of the system 100 is shown in accordance with one or more exemplary embodiments. The system 100 is illustrated as part of a wing 80 and/or a part of a fuselage 84 of an aircraft 70.

The fastener 110 generally has a tapered head 112 with an outer end 113 that is flush with the second side 124 of the composite laminate 120. The composite laminate 120 in the example has tows 130 arranged in multiple (e.g., 4) directions 82*a*-82*d* (e.g., −45 degrees, 0 degrees, +45 degrees, and 90 degrees) relative to a major axis of the wing 80 (e.g., a wingtip-to-fuselage wing direction 83) or the fuselage 84 (e.g., a fuselage direction 86 between a nose 88 and a tail 89). In the example, an electrical strike 90 to the tapered head 112 of the fastener 110 generally produces currents 92 that run parallel to the 0 degree tows.

Figure 3:
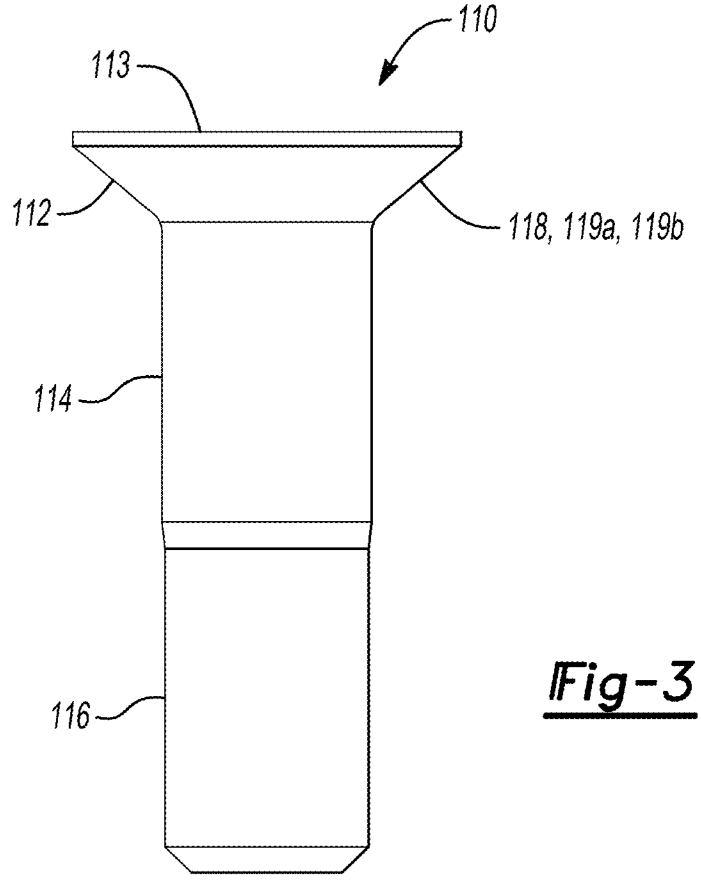
FIG. 3 is a side view schematic diagram of a fastener in accordance with one or more exemplary embodiments.

Referring to FIG. 3, a side view schematic diagram of an example implementation of the fastener 110 is shown in accordance with one or more exemplary embodiments. The fastener 110 generally includes a tapered head 112, a shank 114, and a threaded portion 116. The tapered head 112 may be coated with a malleable coating 118 (or material) that is electrically conductive. In various embodiments, the malleable coating 118 may be copper 119*a*, indium 119*b*, or other malleable conductive material.

The tapered head 112 generally extends from the outer end 113 to the shank 114.

The shank 114 has a cylindrical shape that extends from a bottom end of the tapered head 112 to the threaded portion 116.

The threaded portion 116 is attached to the shank 114. The threaded portion 116 generally includes threads to engage and secure to the nut 160 (FIG. 1).

Figure 4:
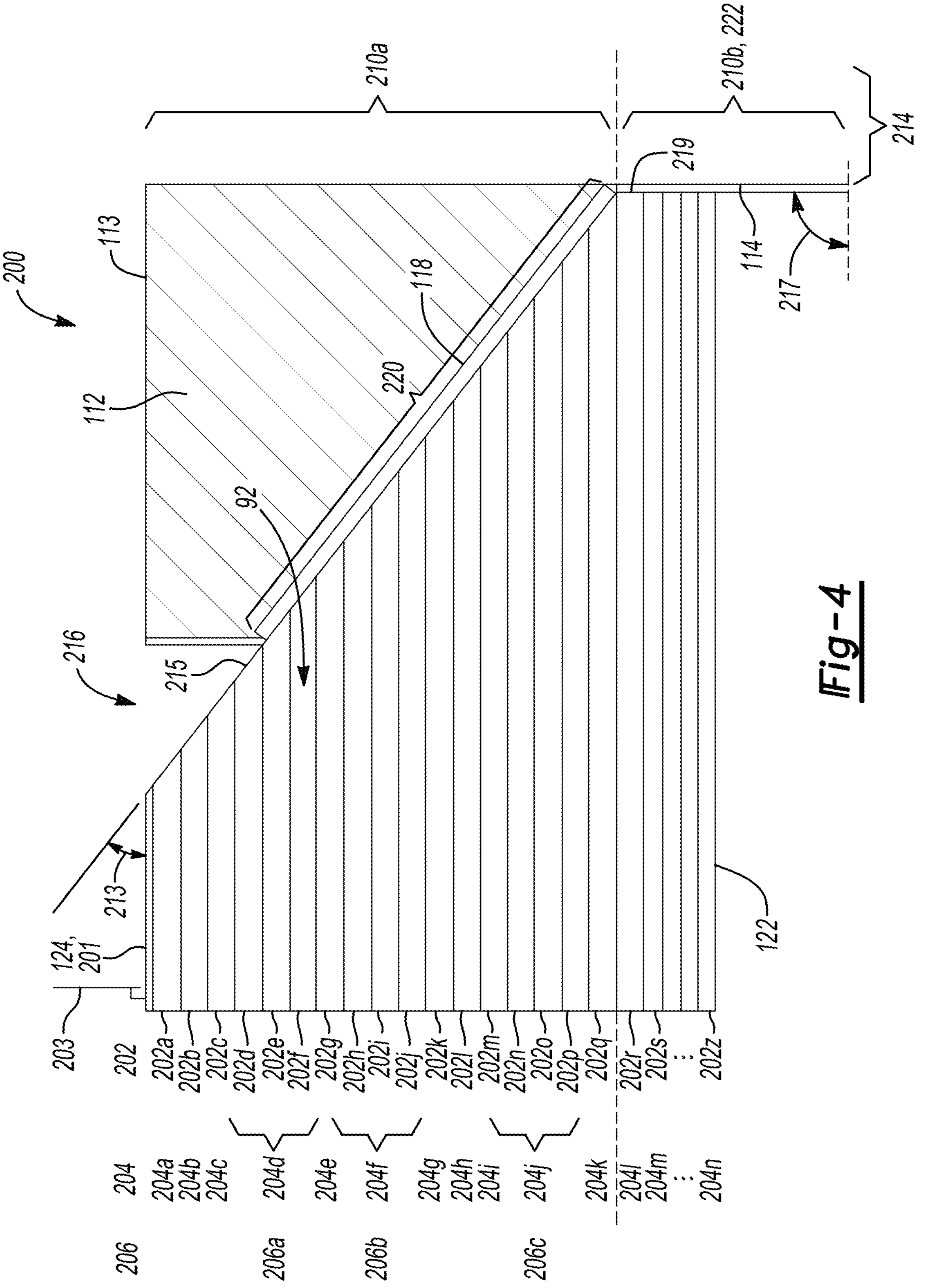
FIG. 4 is a schematic cross-sectional diagram of a region where the fastener engages the composite material in accordance with one or more exemplary embodiments.

Referring to FIG. 4, a schematic cross-sectional diagram of an example region 200 where the fastener 110 engages the composite laminate 120 is shown in accordance with one or more exemplary embodiments. The composite laminate 120 may be fabricated in multiple fibers 202 (e.g., 202*a*-202*z*). Various neighboring fibers 202 are arranged as −45 degree toes, 0 degree toes, +45 degree toes and 90 degree toes.

The fibers 202 may be fabricated in multiple tow groups 204 (e.g., 204*a*-204*n*). Each tow group 204 generally includes one or more adjoining fibers 202. For example, tow groups 204*a*, 204*b* and 204*c* are limited to single fibers 202*a*, 202*b*, and 202*c*, respectively. Tow groups 204*d*, 204*f* and 204*j* each include multiple (e.g., three or more) adjoining fibers 202 (e.g., 202*d*-202*f*, 202*h*-202*j*, and 202*n*-202*p*). The multi-fiber tow groups are generally separated by one or more single-fiber tow groups. Other numbers of fibers, other numbers of tow groups, and/or other numbers of fibers withing the multiple fiber tow groups may be implemented to meet the design criteria of a particular application.

By way of example, the tow groups 204 that include multiple adjoining fibers 202, (e.g., outer tow groups 204*d*, 204*f* and 204*j*) place the corresponding the fibers 202*d*-202*f*, 202*h*-202*j*, and 202*n*-202*p* in the same major axis orientation (e.g., the 0 degree direction 82*a* in FIG. 2). The fibers 202*d*-202*f*, 202*h*-202*j*, and 202*n*-202*p* within the outer tow groups 204*d*, 204*f* and 204*j* are generally carbon fibers that are fabricated to conduct the current 92 along a length of the fibers. The tow groups 204*a*-204*c*, 204*e*, 204*g*-204*h*, 204*j*-204*n* generally include fibers oriented in the other directions 82*b*-82*d* (FIG. 2) (e.g., −45 degree, +45 degrees and 90 degrees) and some fibers may be oriented in the given direction (e.g., 0 degrees).

The tow groups 204 may be formed as multiple (e.g., two or more) composite plys 210*a*-210*b*. A first composite ply 210*a* generally spans from the second side 124 (top side as illustrated) of the composite laminate 120 to the shank 114 of the fastener 110 while the fastener 110 is seated in system 100. The first composite ply 210*a* generally incudes first tow groups 204*a*-204*k*. First ends 215 of the fibers 202*a*-202*q* in a first composite ply 210*a* that align with a tapered bore 216 (that is shaped to receive the tapered head 112 of the fastener 110) are cut at a first angle 213. The first angle 213 generally matches the tapering of the tapered bore 216 and the tapered head 112. The first tow groups 204*a*-204*k* with three of more conductive fibers 202 aligned the given direction (e.g., 0 degree direction 82*a* in FIG. 2), and stacked directly on each other in a normal direction 203 relative to an outer surface 201 of the second side 124, may be referred to as conductive tow groups 206 (e.g., 206*a*, 206*b* and 206*c*).

A second composite ply 210*b* generally spans from the first composite ply 210*a* to the first side 122 (bottom side as illustrated) of the composite laminate 120. Second ends 219 of the fibers 202*r*-202*z* (or second tow groups 204*l*-204*n*) in second composite ply 210*b* that align with a straight bore 214 (that is shaped to receive the shank 114 and/or the threaded portion 116) may be cut at a second angle 217. The second angle 217 is oriented perpendicular to the straight bore 214.

By grouping the fibers 202*a*-202*q* in the countersink region of the tapered head 112, a first area 220 of reliable electrical contact between the malleable coating 118 on the tapered head 112 is greater than that of a second area 222 at the shank 114 and the threaded portion 116, thus allowing current to flow out. The malleable coating 118 provides an additional enhanced mechanism to transfer the current 92 from the fastener 110 to the skin carbon fibers 202*a*-202*q*. Having the current path in the countersink region of the tapered head 112 also provides more surface area of the sloped fiber bed of the first composite ply 210*a* to be in contact with the fastener 110 compared with the blunt cut edge in the second composite ply 210*b*.

In various embodiments, the conductive tow groups 206*a*, 206*b* and 206*c* may be formed of different material to improve dissipation of the electrical strike. The conductive tow groups 206*a*, 206*b* and 206*c* may be formed only in the tapered head area of the fastener 110 to help maintain the currents 92 near the outer surface of the composite laminate 120. Furthermore, the first composite ply 210*a* may have a range of fibers in electrical contact with the fastener 110. For example, approximately 20 percent to 100 percent (e.g., 50 percent) of the fibers may be in electrical contact with the fastener 110.

Figure 5:
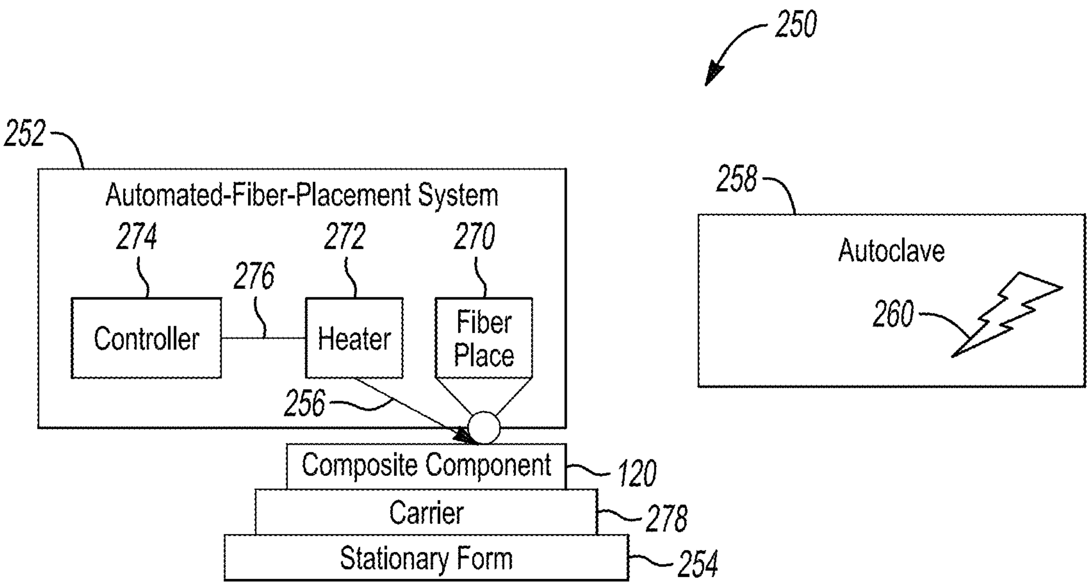
FIG. 5 is a schematic diagram of a manufacturing system in accordance with an exemplary embodiment.

Referring to FIG. 5, a schematic diagram of an example implementation of a manufacturing system 250 is shown in accordance with an exemplary embodiment. The manufacturing system 250 generally includes an automated-fiber-placement (AFP) system 252, a stationary form 254, a layup heat 256, and an autoclave 258 that generates a curing heat 260. The automated-fiber-placement system 252 includes a fiber-placement machine 270, a heater 272, and a controller 274. The manufacturing system 250 is generally operational to create the composite laminate 120 on a carrier 278. By the end of the manufacturing process, the composite laminate 120 is separated from the carrier 278.

The automated-fiber-placement system 252 implements a moving machine that lays multiple narrow tows on the stationary form 254. The automated-fiber-placement system 252 is operational to deposit (or paint) a plurality of sliced layers on the stationary form 254 to create the composite laminate 120. The automated-fiber-placement system 252 is also configured to apply the layup heat 256 to a plurality of target areas on the sliced layers during the deposition.

The stationary form 254 implements an approximately flat surface. The stationary form 254 is operational to provide a substantially horizontal surface onto which the tows are deposited to create the composite laminate 120.

The layup heat 256 implements an optical beam (or signal). In various embodiments, the layup heat 256 is a laser beam controlled to be scanned in multiple (e.g., two) dimensions across the tows as the tows are being deposited on the stationary form 254. The layup heat 256 warms a portion of the tows previously deposited and/or a portion of the tows being deposited just before, or as the tows pass by a compression roller of the fiber-placement machine 270.

The autoclave 258 implements a curing chamber. The autoclave 258 is operational to apply the curing heat 260 to the composite laminate 120. The autoclave 258 may also be operational to cure the composite laminate 120 under heat, vacuum and/or pressure. An inert atmosphere, such as nitrogen or carbon dioxide, may be provided inside the autoclave 258.

The curing heat 260 implements a controlled heat. The curing heat 260 may be generated by an electric heater, a steam heater, a gas heater, an externally fired heater, or the like. The curing heat 260 inhibits a slippage in overlap splices when the composite laminate 120 is subjected to external forces.

The fiber-placement machine 270 implements a composite ply placement machine. The fiber-placement machine 270 is generally operational to paint (or deposit) multiple sliced layers of the tow onto the carrier 278. The tow may be deposited in multiple layers. In various embodiments, the layers may be created with the tows oriented at particular angles (e.g., +45 degrees, 0 degrees, −45 degrees, and 90 degrees) relative to a planned orientation of the composite laminate 120. In other embodiments, the tows may be oriented at other angles (e.g., +60 degrees, 0 degrees, −60 degrees, and 90 degrees) relative to a planned orientation of the composite laminate 120. Other angles and/or other numbers of the angles may be implemented to meet the design criteria of a particular application.

The fiber-placement machine 270 may include, but is not limited to, a head, a compaction roller, a bulk reel of the composite ply, one or more guide rollers, and/or a drive mechanism for urging the compaction roller. The head of the fiber-placement machine 270 generally brings together a set of the tows. The set is then feed to the compaction roller. The compaction roller presses the tows onto the stationary form 254.

The heater 272 implements an optical heater. The heater 272 is operational to generate the optical signal that provides the layup heat 256. In various embodiments, the heater 272 may be a continuous-wave laser modulated to achieve a specified pulse frequency. In some embodiments, the heater 272 may be a pulse laser that emits at a specified pulse frequency.

The controller 274 implements a processor circuit (e.g., one or more microprocessors). The controller 274 may be operational to control application and scanning of the layup heat 256. The controller 274 is also operational to communicate with the heater 272 via the control lines 276. Control of the layup heat 256 may include, but is not limited to, control over an optical power, a pulse frequency, and a spatial direction of the optical signal.

The control lines 276 are implemented as one or more electrical wires and/or busses. The control lines 276 are generally operational to provide bidirectional communication between the controller 274 and the heater 272.

The composite laminate 120 implements a structural part of a vehicle or an object. In various embodiments, the vehicle may be an aircraft, an automobile, a truck, a boat, or the like. The object may be a container, a covering, a shelter, or the like. The composite laminate 120 may be implemented as parts of other types vehicles or objects to meet a design criteria of a particular application.

Figure 6:
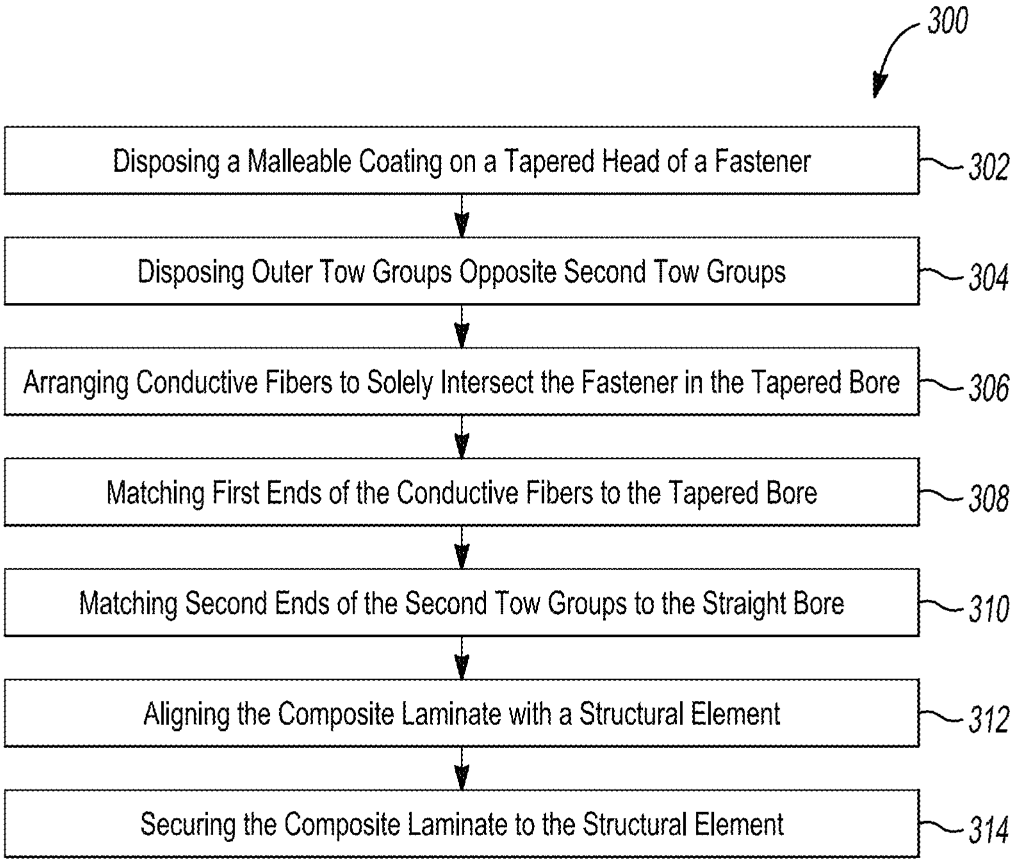
FIG. 6 is a flow diagram of a method of fabrication for electrical strike dissipation in accordance with one or more exemplary embodiments.

Referring to FIG. 6, a flow diagram of an example method 300 of fabrication for electrical strike dissipation is shown in accordance with one or more exemplary embodiments. The method 300 is implemented using the manufacturing system 250. The method 300 generally includes steps 302 to 314, as illustrated. The sequence of steps is shown as a representative example. Other step orders may be implemented to meet the criteria of a particular application.

In the step 302, the malleable coating 118 may be applied (or disposed) on a tapered head 112 of a fastener 110. The outer tow groups (e.g., tow groups 204*d*, 204*f*, and 204*j*) within the composite laminate 120 are disposed (or formed) on an opposite side of the composite laminate 120 as the second tow groups 204*l*-204*n* in the step 304.

The outer tow groups with the three or more conductive fibers (e.g., tow groups 204*d*, 204*f*, and 204*j*) are arranged in the step 306 to solely intersect the fastener 110 in the tapered bore 216 to confine the current 92 approximate the outer layer 126 of the composite laminate 120. In the step 308, the first ends 215 of the conductive fibers 202 are formed (e.g., cut) to spatially match the tapered bore 216. In the step 310, the first ends 215 of the conductive fibers 202 are formed (e.g., cut) to spatially match the straight bore 214.

In the step 312, the composite laminate 120 may be aligned with the structural element 150. Thereafter, the composite laminate 120 is secured to the structural element 150 in the step 314 using the fasteners 110 and the nuts 160.

As explained above and reiterated below, the present disclosure includes, without limitation, the following example implementations.

Clause 1. A system comprising a fastener that has a tapered head that conducts electricity and a shank; a composite laminate that includes: a first composite ply that defines an outer surface, defines a tapered bore, and has a plurality of first tow groups oriented in a plurality of directions parallel to the outer surface, wherein: a conductive tow group of the plurality of first tow groups has three or more conductive fibers stacked directly on each other in a normal direction relative to the outer surface; the three or more conductive fibers are oriented in a given direction of the plurality of directions; the three or more conductive fibers are operational to conduct current of the electrical strike; and the tapered bore extends through the first composite ply and is sized to receive the tapered head of the fastener; and a second composite ply attached to the first composite ply, defines a straight bore, and has a plurality of second tow groups oriented in the plurality of directions, wherein: the straight bore extends through the second composite ply and is sized to receive the shank of the fastener; and a structural element aligned with the composite laminate and secured to the composite laminate by the fastener.

Clause 2. The system according to clause 1, wherein the conductive tow group comprises two or more conductive tow groups separated from each other by one or more of the plurality of first tow groups.

Clause 3. The system according to clause 1 or cause 2, wherein the three or more conductive fibers are arranged to solely intersect the fastener in the tapered bore to confine the electricity approximate an outer layer of the composite laminate.

Clause 4. The system according to clause 1 or clause 2, further comprising a malleable coating disposed on the tapered head of the fastener, and operational to electrically connect the fastener to the three or more conductive fibers due to a fastener pre-load while the fastener is seated.

Clause 5. The system according to clause 1 or clause 2, wherein a plurality of first ends of the three or more conductive fibers are formed to match the tapered bore and physically contact the tapered head.

Clause 6. The system according to clause 5, wherein a plurality of second ends of the plurality of second tow groups are formed to match the straight bore.

Clause 7. The system according to clause 1 or clause 2, further comprising one or more outer tow groups of the plurality of first tow groups disposed on an opposite side of the conductive tow group as the one or more second tow groups.

Clause 8. The system according to clause 1 or clause 2, wherein an outer end of the tapered head of the fastener is flush with the outer surface of the first composite ply while seated.

Clause 9. The system according to clause 1 or clause 2, wherein the system forms part of an aircraft.

Clause 10. The system according to clause 9, wherein the given direction is one or more of (i) a wing direction of the aircraft and (ii) a fuselage direction of the aircraft.

Clause 11. A method of fabrication for electrical strike dissipation comprising: aligning a composite laminate with a structural element to receive a fastener, wherein: the fastener has a tapered head that conducts electricity, and a shank; and the composite laminate includes: a first composite ply that defines an outer surface, defines a tapered bore, and has a plurality of first tow groups oriented in a plurality of directions parallel to the outer surface, wherein: a conductive tow group of the plurality of first tow groups has three or more conductive fibers stacked directly on each other in a normal direction relative to the outer surface; the three or more conductive fibers are oriented in a given direction of the plurality of directions; the three or more conductive fibers are operational to conduct current of the electrical strike; and the tapered bore extends through the first composite ply and is sized to receive the tapered head of the fastener; and a second composite ply attached to the first composite ply, defines a straight bore, and has a plurality of second tow groups oriented in the plurality of directions, wherein: the straight bore extends through the second composite ply and is sized to receive the shank of the fastener; and securing the composite laminate to the structural element with the fastener.

Clause 12. The method according to clause 11, wherein the conductive tow group comprises two or more conductive tow groups separated from each other by one or more of the plurality of first tow groups.

Clause 13. The method according to clause 11 or clause 12, further comprising arranging the three or more conductive fibers to solely intersect the fastener in the tapered bore to confine the electricity approximate an outer layer of the composite laminate.

Clause 14. The method according to clause 11 or clause 12, further comprising disposing a malleable coating on the tapered head of the fastener to electrically connect the fastener to the three or more conductive fibers due to a fastener pre-load while the fastener is seated.

Clause 15. The method according to clause 11 or clause 12, further comprising matching a plurality of first ends of the three or more conductive fibers to the tapered bore to physically contact the tapered head.

Clause 16. The method according to clause 15, further comprising matching a plurality of second ends of the plurality of second tow groups to the straight bore.

Clause 17. The method according to clause 11 or clause 12, further comprising disposing one or more outer tow groups of the plurality of first tow groups on an opposite side of the conductive tow group as the one or more second tow groups.

Clause 18. The method according to clause 11 or clause 12, wherein an outer end of the tapered head of the fastener is flush with the outer surface of the first composite ply while seated.

Clause 19. The method according to clause 11 or clause 12, wherein the method fabricates part of an aircraft.

Clause 20. A composite laminate comprising a first composite ply that defines an outer surface, defines a tapered bore, and has a plurality of first tow groups oriented in a plurality of directions parallel to the outer surface, wherein: a conductive tow group of the plurality of first tow groups has three or more conductive fibers stacked directly on each other in a normal direction relative to the outer surface; the three or more conductive fibers are oriented in a given direction of the plurality of directions; the three or more conductive fibers are operational to conduct current of an electrical strike; and the tapered bore extends through the first composite ply and is sized to receive a tapered head of a fastener; and a second composite ply attached to the first composite ply, defines a straight bore, and has a plurality of second tow groups oriented in the plurality of directions, wherein: the straight bore extends through the second composite ply and is sized to receive a shank of the fastener.

This disclosure is susceptible of embodiments in many different forms. Representative embodiments of the disclosure are shown in the drawings and are herein described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise.

For purposes of the present detailed description, unless specifically disclaimed, the singular includes the plural and vice versa. The words "and" and "or" shall be both conjunctive and disjunctive. The words "any" and "all" shall both mean "any and all", and the words "including," "containing," "comprising," "having," and the like shall each mean "including without limitation." Moreover, words of approximation such as "about," "almost," "substantially," "approximately," and "generally," may be used herein in the sense of "at, near, or nearly at," or "within 0-5% of," or "within acceptable manufacturing tolerances," or other logical combinations thereof. Referring to the drawings, wherein like reference numbers refer to like components.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for electrical strike dissipation comprising:
a fastener that has a tapered head that conducts electricity and a shank;
a composite laminate that includes:
a first composite ply that defines an outer surface, defines a tapered bore, and has a plurality of first tow groups oriented in a plurality of directions parallel to the outer surface, wherein:
a conductive tow group of the plurality of first tow groups has three or more conductive fibers stacked directly on each other in a normal direction relative to the outer surface;
the three or more conductive fibers are oriented in a given direction of the plurality of directions;
the three or more conductive fibers are operational to conduct current of the electrical strike; and
the tapered bore extends through the first composite ply and is sized to receive the tapered head of the fastener; and
a second composite ply attached to the first composite ply, defines a straight bore, and has a plurality of second tow groups oriented in the plurality of directions, wherein:
the straight bore extends through the second composite ply and is sized to receive the shank of the fastener; and
a structural element aligned with the composite laminate and secured to the composite laminate by the fastener.

2. The system according to claim 1, wherein:
the conductive tow group comprises two or more conductive tow groups separated from each other by one or more of the plurality of first tow groups.

3. The system according to claim 1, wherein:
the three or more conductive fibers are arranged to solely intersect the fastener in the tapered bore to confine the electricity approximate an outer layer of the composite laminate.

4. The system according to claim 1, further comprising:
a malleable coating disposed on the tapered head of the fastener, and operational to electrically connect the fastener to the three or more conductive fibers due to a fastener pre-load while the fastener is seated.

5. The system according to claim 1, wherein:
a plurality of first ends of the three or more conductive fibers are formed to match the tapered bore and physically contact the tapered head.

6. The system according to claim 5, wherein:
a plurality of second ends of the plurality of second tow groups are formed to match the straight bore.

7. The system according to claim 1, further comprising:
one or more outer tow groups of the plurality of first tow groups is disposed on an opposite side of the conductive tow group as the one or more second tow groups.

8. The system according to claim 1, wherein:
an outer end of the tapered head of the fastener is flush with the outer surface of the first composite ply while seated.

9. The system according to claim 1, wherein:
the system forms part of an aircraft.

10. The system according to claim 9, wherein:
the given direction is one or more of (i) a wing direction of the aircraft and (ii) a fuselage direction of the aircraft.

11. A method of fabrication for electrical strike dissipation comprising:
aligning a composite laminate with a structural element to receive a fastener, wherein:
the fastener has a tapered head that conducts electricity, and a shank; and
the composite laminate includes:
a first composite ply that defines an outer surface, defines a tapered bore, and has a plurality of first tow groups oriented in a plurality of directions parallel to the outer surface, wherein:
a conductive tow group of the plurality of first tow groups has three or more conductive fibers stacked directly on each other in a normal direction relative to the outer surface;
the three or more conductive fibers are oriented in a given direction of the plurality of directions;
the three or more conductive fibers are operational to conduct current of the electrical strike; and
the tapered bore extends through the first composite ply and is sized to receive the tapered head of the fastener; and
a second composite ply attached to the first composite ply, defines a straight bore, and has a plurality of second tow groups oriented in the plurality of directions, wherein:
the straight bore extends through the second composite ply and is sized to receive the shank of the fastener; and
securing the composite laminate to the structural element with the fastener.

12. The method according to claim 11, wherein:
the conductive tow group comprises two or more conductive tow groups separated from each other by one or more of the plurality of first tow groups.

13. The method according to claim 11, further comprising:
arranging the three or more conductive fibers to solely intersect the fastener in the tapered bore to confine the electricity approximate an outer layer of the composite laminate.

14. The method according to claim 11, further comprising:
disposing a malleable coating on the tapered head of the fastener to electrically connect the fastener to the three or more conductive fibers due to a fastener pre-load while the fastener is seated.

15. The method according to claim 11, further comprising:
matching a plurality of first ends of the three or more conductive fibers to the tapered bore to physically contact the tapered head.

16. The method according to claim 15, further comprising:
matching a plurality of second ends of the plurality of second tow groups to the straight bore.

17. The method according to claim 11, further comprising:
disposing one or more outer tow groups, of the plurality of first tow groups on an opposite side of the conductive tow group as the one or more second tow groups.

18. The method according to claim 11, wherein:
an outer end of the tapered head of the fastener is flush with the outer surface of the first composite ply while seated.

19. The method according to claim 11, wherein:
the method fabricates part of an aircraft.

20. A composite laminate comprising:
a first composite ply that defines an outer surface, defines a tapered bore, and has a plurality of first tow groups oriented in a plurality of directions parallel to the outer surface, wherein:
a conductive tow group of the plurality of first tow groups has three or more conductive fibers stacked directly on each other in a normal direction relative to the outer surface;
the three or more conductive fibers are oriented in a given direction of the plurality of directions;
the three or more conductive fibers are operational to conduct current of an electrical strike; and
the tapered bore extends through the first composite ply and is sized to receive a tapered head of a fastener; and
a second composite ply attached to the first composite ply, defines a straight bore, and has a plurality of second tow groups oriented in the plurality of directions, wherein:
the straight bore extends through the second composite ply and is sized to receive a shank of the fastener.

* * * * *